No. 648,174. Patented Apr. 24, 1900.
O. W. MEYROWITZ.
INSULATING COUPLING DEVICE.
(Application filed Feb. 27, 1900.)

(No Model.)

Witnesses:
Jean Schmidt.
Samuel Lappin

Inventor:
Oscar W. Meyrowitz

UNITED STATES PATENT OFFICE.

OSCAR W. MEYROWITZ, OF NEW ROCHELLE, NEW YORK.

INSULATING COUPLING DEVICE.

SPECIFICATION forming part of Letters Patent No. 648,174, dated April 24, 1900.

Application filed February 27, 1900. Serial No. 6,773. (No model.)

*To all whom it may concern:*

Be it known that I, OSCAR WILFRIED MEYROWITZ, a citizen of the United States, and a resident of New Rochelle, in the county of Westchester and State of New York, have invented certain new and useful Improvements in Insulating Coupling Devices, of which the following is a specification.

My invention relates to a coupling device designed more particularly for dentists' and surgeons' use in connection with an electric motor, the construction of the coupling being such as to entirely insulate the electric current from the flexible shaft used for rotating the dental instrument, thus obviating all danger of electric shock to the patient.

Figure 1:
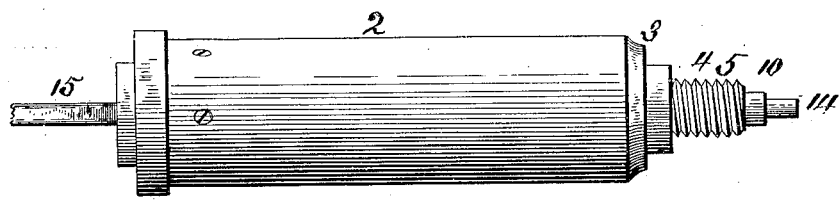
Figure 2:
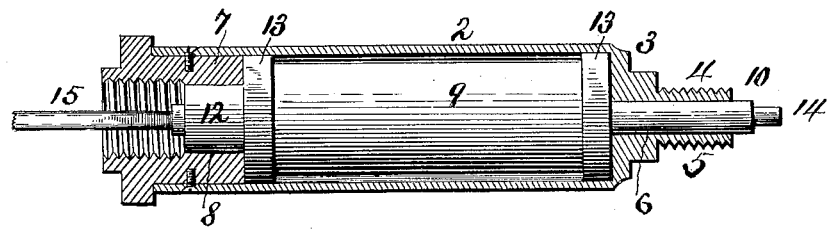

In the accompanying drawings, to which reference is made and which form a part of this specification, Figure 1 is a side elevation of my new coupling-socket, and Fig. 2 is longitudinal sectional elevation of the same.

In the drawings, 2 represents a metal shell or casing formed at one end with a head 3, reduced and extended to form a boss 4, the end of which is externally screw-threaded, as shown at 5. The head 3 and boss 4 are centrally bored, as shown at 6, to form a bearing. The opposite end of the shell or casing 2 is provided with an annular plug 7, of insulating material, such as hard india-rubber, vulcanized fiber, or other suitable material. This plug forms another bearing 8 in line with the bearing 6.

9 is a cylinder, of hard india-rubber, vulcanized fiber, or other insulated material, provided at one end with a reduced central shaft 10 to fit the bearing 6 and provided at the other end with another reduced central shaft 12, which fits the bearing 8. The body of the cylinder 9 is provided at or near its ends with metal bearing-rings 13 13, which fit the interior of the shell or casing 2, so that the said metal shell or casing and the said metal rings form metal bearings for the rotation of the cylinder 9.

The shaft 10 is provided centrally at its outer end with a projecting metal socket 14 for attaching with any appropriate flexible connection to be rotated for rotating the dental or surgical instrument to be used. The shaft 12 is provided centrally with a metal rod or arm 15, preferably squared at one side, to connect with the shaft of an electric motor, so that the rotation of the motor will, through the rod or arm 15, rotate the cylinder 9 and the shafts 10 and 12.

Having thus described my invention, what I claim as new, and desire to secure by Letters Patent, is—

1. The coupling-socket herein shown and described the same consisting of a metal casing or shell having a reduced bearing at one end and an annular reduced bearing of insulating material at the opposite end, in combination with a cylinder of insulating material formed with bearings of the same material at each end, and provided with metal bearing-rings to run in the said metal casing or shell substantially as described.

2. The cylinder 9 of insulating material formed with reduced bearings 10, 12, each having a metal connection embedded in it and provided with metal bearing-rings 13, in combination with a metal shell or casing in which the said cylinder is held and rotated substantially as described.

OSCAR W. MEYROWITZ.

Witnesses:
 JEAN SCHMIDT,
 H. A. WEST.